US007181598B2

(12) United States Patent
Jourdan et al.

(10) Patent No.: US 7,181,598 B2
(45) Date of Patent: Feb. 20, 2007

(54) PREDICTION OF LOAD-STORE DEPENDENCIES IN A PROCESSING AGENT

(75) Inventors: Stephan J. Jourdan, Portland, OR (US); Darrell D. Boggs, Aloha, OR (US); John Alan Miller, Portland, OR (US); Ronak Singhal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 10/146,956

(22) Filed: May 17, 2002

(65) Prior Publication Data

US 2003/0217251 A1    Nov. 20, 2003

(51) Int. Cl.
*G06F 9/312* (2006.01)
(52) U.S. Cl. ............... 712/217; 712/225; 712/214; 711/125
(58) Field of Classification Search ........ 712/216–219, 712/225, 214; 711/125
See application file for complete search history.

(56) References Cited

U.S. PATENT DOCUMENTS

| 5,557,763 | A | 9/1996 | Senter et al. |
| 5,691,920 | A | 11/1997 | Levine et al. |
| 5,781,752 | A | 7/1998 | Moshovos et al. |
| 5,898,854 | A | 4/1999 | Abramson et al. |
| 5,987,595 | A * | 11/1999 | Yoaz et al. ......... 712/216 |
| 6,108,770 | A | 8/2000 | Chrysos et al. |
| 6,622,237 | B1 * | 9/2003 | Keller et al. ......... 712/216 |

OTHER PUBLICATIONS

Rotenberg, Eric, et al. Trace Cache: a Low Latency Approach to High Bandwidth Instruction Fetching, 1996, IEEE, pp. 24-34.*
Hennessy, et al., Computer Architecture: A Quantative Apporach, 1996, Morgan Kaufman, Inc., Second Edition, pp. 40,41, 377-380, 660-661, 242-251.*
Hennessy et al, Section 5.5 "Microprogramming: Simplifying Control Design", *Computer Organization and Design, The Hardware/Software Interface*, pp. 399-400, 2nd edition, Morgan Kaufmann Publishers, Inc., San Francisco, California, 1998.
Related U.S. Appl. No. 09/964,807, filed Sep. 28, 2001.

* cited by examiner

*Primary Examiner*—Fritz Fleming
*Assistant Examiner*—Tonia L. Meonske
(74) *Attorney, Agent, or Firm*—Kenyon & Kenyon LLP (57) ABSTRACT

In a processing core, a newly received load instruction may be dependent upon a previously received store instruction. The core may include a predictor to predict such dependencies and provide an identification of a colliding store instruction. The load instruction may be stored in a scheduler with a dependency marker. Thereafter, the load instruction may be prevented from executing until after execution of the colliding store. Upon execution of the load, the accuracy of the prediction is confirmed. Upon retirement of the load instruction, new prediction results may be provided to the predictor.

18 Claims, 7 Drawing Sheets

REGISTER FILE SCOREBOARD

510

STORE BUFFER SCOREBOARD

PREDICTION OF LOAD-STORE DEPENDENCIES IN A PROCESSING AGENT

BACKGROUND

The present invention relates to management of instructions in a processing core and, more particularly, to management of load instructions when dependencies are predicted with reference to older store instructions.

In out of order execution systems, it often is useful to predict the outcome of certain instructions before they have been executed. In the context of load instructions, prediction of dependencies between load instructions and previously-received store instructions can conserve processing resources. Execution of the load instruction should be deferred until after the store instruction executes. If the load instruction executed first, it would acquire invalid data. Thereafter, all instructions that are dependent upon the load instruction also would be permitted to execute, again with invalid data. Later, the core would cause the load instruction and all those instructions that are dependent on the load instruction to re-execute, possibly multiple times. The processing resources that were spent to execute and possibly re-execute the load instruction would be wasted. Other instructions could have been executed instead, yielding useful results. This phenomenon is explained in greater detail in a co-pending application Ser. No. 09/964,807, filed Sep. 28, 2001, and assigned to Intel Corp.

The present application proposes an implementation scheme to detect dependencies among load instructions and store instructions and to manage these instructions as they are processed by a core execution unit.

DETAILED DESCRIPTION

Embodiments of the present invention provide techniques for managing load instructions in a processing core when dependency predictions are made between load instructions and store instructions. The core may include a predictor to predict such dependencies and provide an identification of a colliding store instruction. The load instruction may be stored in a scheduler with a dependency marker. Thereafter, the load instruction may be prevented from executing until after execution of the colliding store. Upon execution of the load, the accuracy of the prediction is confirmed. Upon retirement of the load instruction, new prediction results may be provided to the predictor.

Figure 1:
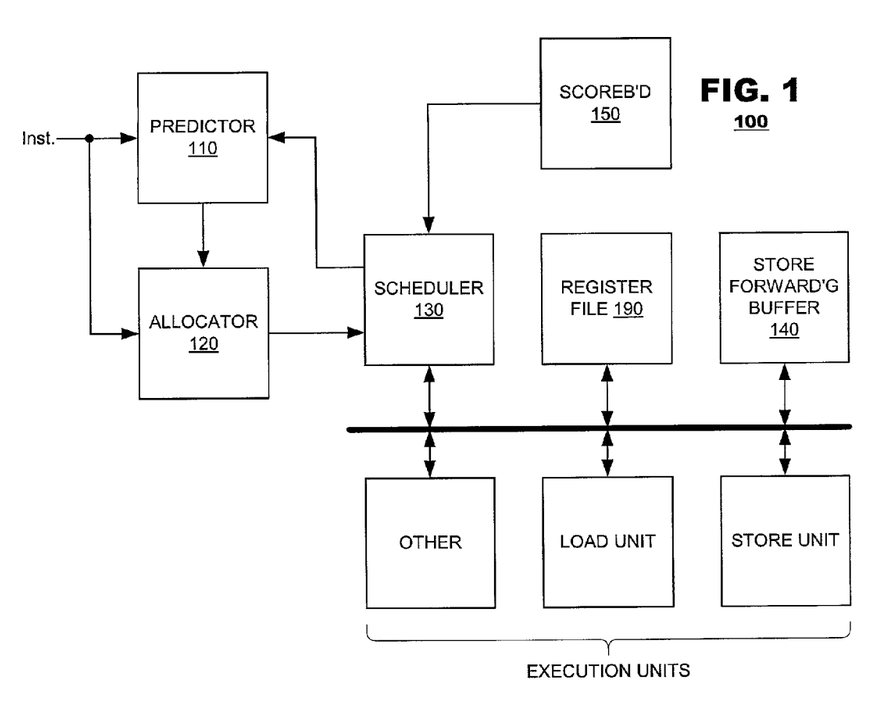
FIG. 1 is a block diagram of a execution core of a processing agent according to an embodiment of the present invention.

FIG. 1 is a block diagram of an execution core 100 of a processing agent according to an embodiment of the present invention. The core 100 may include a predictor 110, an allocator 120, a scheduler 130, a store buffer 140, a scoreboard 150, a register file 160 and a plurality of execution units. The predictor 110 receives decoded instruction and predicts dependencies between them and previously received instructions. The allocator 120 also receives the decoded instructions and assigns resources to them from within the core 100. For example, the allocator 120 may assign registers from within the register file 160 to an ADD instruction or may assign buffer entries from within the store buffer 140 to store instructions. The resources allocated, of course, depend upon the instructions received by the allocator. The allocator 120 also stores the instructions in the scheduler 130, typically in program order.

The scheduler 130 determines when an instruction may be executed. It refers scheduled instructions to an execution unit that is designated to handle the instruction. For example, ADD instructions may be referred to an arithmetic logic unit (not shown) for execution, load instructions may be referred to a load unit 170 and store instructions may be referred to a store unit 180. These execution units cause the instruction to be performed-generating a sum in the case of the ADD instruction or moving data from or to the memory hierarchy in the case of the load or store instructions. To determine when to schedule individual instructions, the scheduler 130 may refer to the scoreboard 150. The scoreboard 150 maintains information regarding which instructions have been executed and which have not.

Embodiments of the present invention provide a scheme for recording dependencies between load instructions and store instructions in a processing core and for managing those dependencies. Various embodiments of this scheme may be employed when new load instructions are received and stored in the scheduler, when executing store instructions, when executing load instructions and when retiring load instructions.

Figure 2:
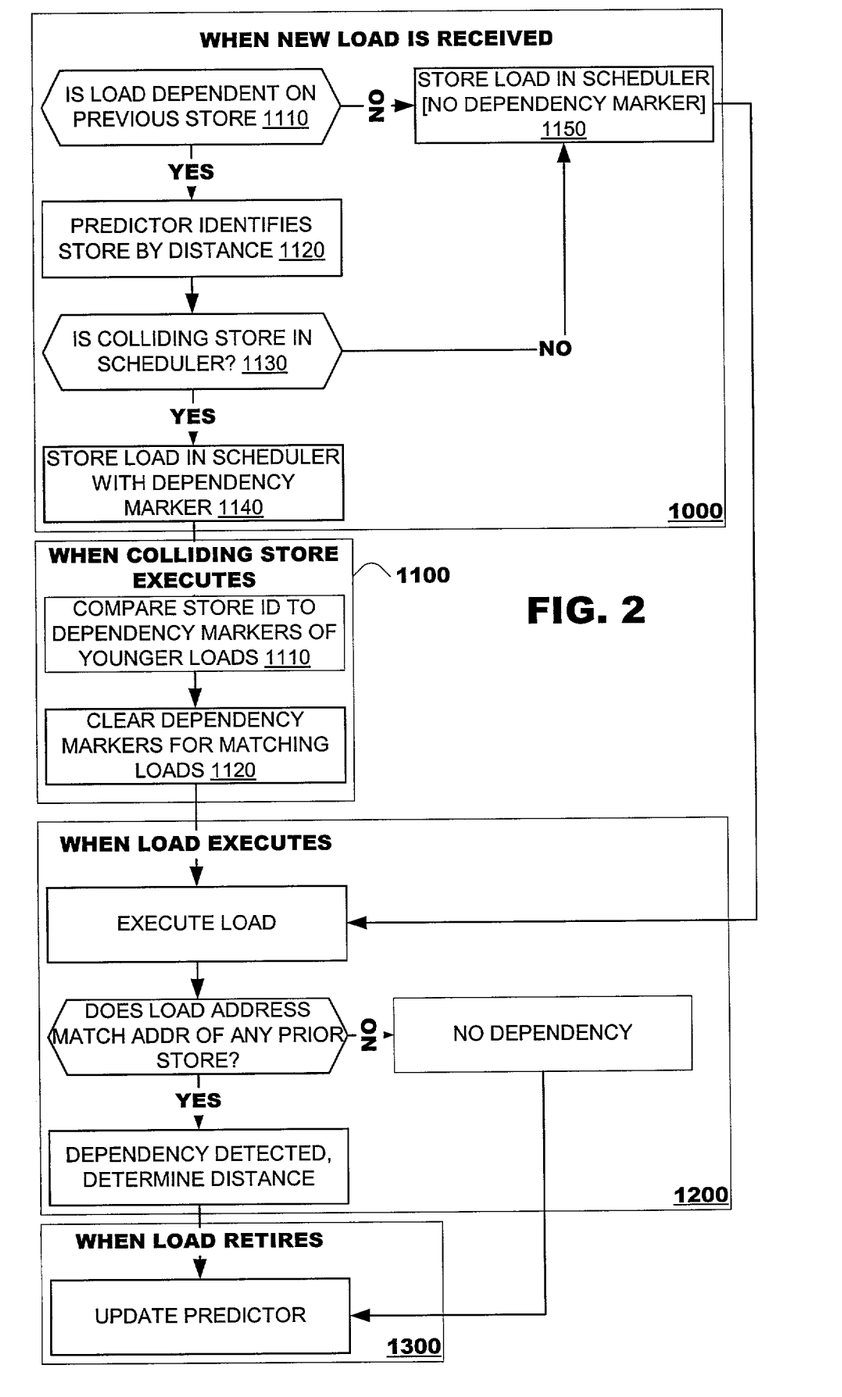
FIG. 2 illustrates various methods that may implement this scheme during the life of a load instruction, according to an embodiment of the present invention.

FIG. 2 illustrates various methods that may implement this scheme during the life of a load instruction, according to an embodiment of the present invention. A first method 1000 may become operable when the load instruction is received by the core. At that time, it may be predicted whether the new load instruction is dependent upon a previous store (box 1110). If so, the predictor may identify the "colliding store," the store instruction upon which the new load is predicted to depend, by a distance measured in numbers of stores (box 1120). Thus, the predictor may indicate that the $5^{th}$ previous store is predicted to collide with the new load. Thereafter, the method may determine whether the colliding store is present within the core (box 1130). If so, the load instruction may be stored within the scheduler with a dependency marker identifying the colliding store (box 1140). If the method predicted that the load is not dependent upon a prior store or it predicted a collision but the store was not present in the core, then the load may be stored in the scheduler without a dependency marking (box 1150).

According to an embodiment, when a load in the scheduler is marked to identify a dependency with a prior store instruction, the load instruction will not be scheduled for execution until the store instruction has executed. If the store has not executed, executing the load instruction may cause the load to acquire invalid data. Instructions that depend upon the load could be permitted to execute, again with bad data. The load and other subsequent instructions may have to be re-executed with correct data. Thus, deferral of the dependent load helps to improve operation throughput by limiting the extent to which instructions would have to be re-executed.

FIG. 2 illustrates a second method 1100 according to an embodiment of the present invention. This method may become operable when the colliding store executes. The colliding store may be scheduled for execution according to conventional techniques. When it executes, the dependency markers for younger loads, loads following the executed store, are compared with identifiers for the executed store instruction (box 1110). For example, the identifiers may be store buffer IDs for the store instructions. If there is a match, the dependency marker is cleared (box 1120). Thereafter, the dependent load instruction may be scheduled for execution.

FIG. 2 illustrates a third method 1200 according to an embodiment of the present invention. The method may become operable when a load instruction executes. According to the method, the load may execute according to conventional techniques (box 1210). Thereafter, an address of the load may be compared with addresses in the store buffer associated with older store instructions (box 1220). If there is a match, a distance between the load instruction and the older store instruction, measured in numbers of store instructions, is determined (box 1230). If multiple matches are detected, a distance is taken from the store instruction closest to the new load instruction, the youngest of the matching older store instructions. If no match is detected, no dependency is detected with any store present in the core (box 1240).

FIG. 2 illustrates another method 1300 according to an embodiment of the present invention. The method may become operable when a load instruction retires. According to the method, the predictor may be updated (box 1310). Updating of the predictor may occur in several ways. If a dependency was detected via the operation at box 1230, the distance may be stored in the predictor. Thus, if the core received the load instruction again, as might occur in a program loop, the predictor may predict a dependency based on the stored distance. If no dependency was detected, the predictor may be updated to erase any dependency previously stored by the predictor in association with the retiring load instruction. Alternatively, if a dependency had previously been detected, updating the predictor may require no change. This second alternative may be appropriate to retain a dependency associations that may have been detected in prior iterations of the method but were missed on a new iteration because, for example, the colliding store may have retired and been removed from the machine before execution of the load instruction.

Conventionally, it commonly occurs that a processing core will execute an instruction several times before it retires and the instruction is removed from the core. Re-execution of an instruction may be triggered by latency mispredictions or dependency mispredictions somewhere earlier in program flow. With reference to FIG. 2, the methods 1100 and 1200 may be performed several times as the corresponding instructions are executed and possibly re-executed by the core. Thus, a dependency noted when a load instruction is executed first may be overwritten with another dependency (or a "non-dependency") during a subsequent execution of the method 1200.

Figure 3:
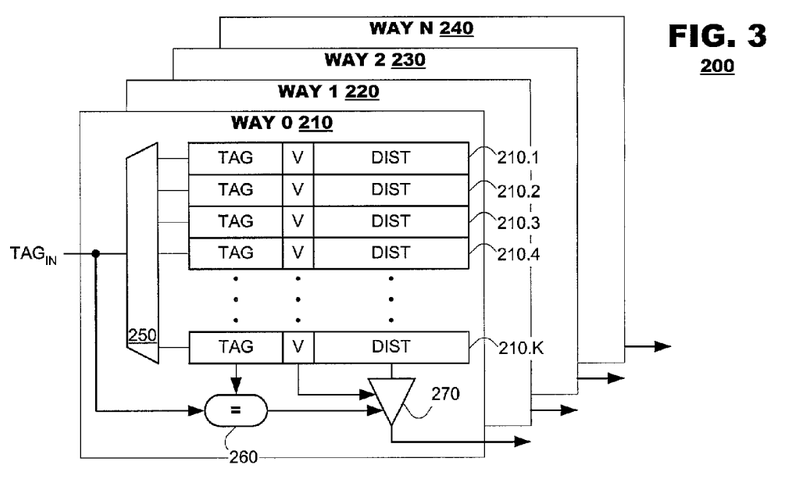
FIG. 3 is a block diagram illustrating a predictor 200 according to an embodiment of the present invention.

FIG. 3 is a block diagram illustrating a predictor 200 according to an embodiment of the present invention. In one embodiment, the predictor may be provisioned as a set-associative cache, divided into plural ways 210–240. In such an embodiment, entries 210.1–210.K of each way (say, way 0 210) may include data storing an instruction pointer 212, a state flag (labeled "V") and a distance value 214. The instruction pointer represents an address of an instruction. The state flag V indicates whether data stored in the respective entry is valid and the distance field 214 represents a prediction distance as described above.

Each way 210 may include an address decoder 250, a comparator 260 and a buffer 270. The address decoder may be responsive to the instruction pointer of a new load instruction. In response to the instruction pointer, the address decoder 250 activates one of the entries in the way 210 (say, entry 210.1), causing it to output its contents therefrom. Typically, only a portion of the instruction pointer is necessary to address an entry. For example, in a way having 32 entries, only five bits of the instruction pointer could be used to address the entry. The comparator 260 may receive all or part of the input address and the IP value output from the addressed entry 210.1. If they are the same, the comparator may generate an enabling signal to the buffer 270. Similarly, the valid field V of the addressed entry is output to the buffer. If the buffer 270 receives signals indicating that an instruction pointer match has been detected and the valid field V indicates valid data, the buffer 270 permits the distance field being output from the entry 210.1 to be output from the way 210. Otherwise, the buffer 270 may block the distance field, preventing it from propagating from the way 210.

In an embodiment, the various ways 210–240 may operate as described above an in parallel. At most one of the ways (say, way 210) should output a distance value in response to an input instruction pointer. This output may be used by the remainder of the core (FIG. 1) as a predicted distance.

Figure 4:
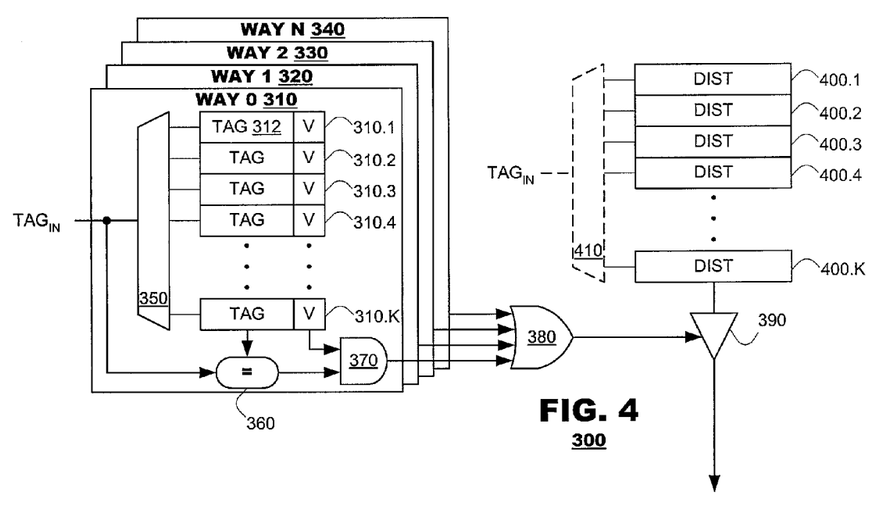
FIG. 4 illustrates another embodiment of a predictor 300 according to an embodiment of the present invention.

FIG. 4 illustrates another embodiment of a predictor 300 according to an embodiment of the present invention. In this embodiment, the predictor is set-associative in terms of determining whether an instruction pointer hits the predictor but it shares a distance field among all ways. Thus, valid prediction distances may be stored for one or possibly many ways. When a new prediction distance is stored in the predictor, the state flag of one of the ways (say, way 0 310) is enabled and the state flags of all other ways 320–340 are disabled with respect to the corresponding entry.

As illustrated in FIG. 4, this embodiment may be populated by plural ways 310–340. Each way (say, way 0 310) may include a plurality of entries 310.1–310.K, each having fields for storage of instruction pointer data 312 and a state flag V. The way 310 also may include an address decoder 350 and a comparator 360 to determine whether input instruction pointers match a stored instruction pointer from within the way 310.

In this embodiment, the way also may include an AND gate 370 having inputs coupled to the state flags V and the comparator 360. An output of the AND gate 370 may generate an enabling signal only if the comparator 360 indicates an instruction pointer match and the state flag indicates that the distance field is valid for the stored instruction pointer. Outputs from AND gates 370 of the various ways 310–340 may be input to an OR gate 380. An output of the OR gate may control a buffer 390.

According to an embodiment, prediction distance values may be stored in entries 400.1–400-K within the predictor 300. The predictor may include a separate address decoder 410 to generate driving signals to the entries. Alternatively, the address decoder 410 may be omitted and, instead, an address decoder 350 from one of the ways 310 may be used to drive the entries 400.1–400.K. The address decoder 410 is illustrated in phantom for this purpose.

FIGS. 3 and 4 illustrate structure of the predictors to determine whether an input instruction pointer hits the predictor and to output a distance value. The predictors also may include circuitry (not shown), such as state machine controllers, to write data to various entries. Such circuitry is common in cache designs; it has been omitted from FIGS. 3 and 4 to keep the presentation of the predictor structure a simple one.

In an embodiment, the distance fields 210.J–210.K of the predictor 200 (FIG. 3) may be a multi-bit field representing a distance value. In a first embodiment, the length of the distance field 210.J–210.K may be determined by a depth of the store buffer 140 (FIG. 1). If there were 32 entries in the store buffer 140, the distance fields may be 5 bits long ($2^5$=32). Alternatively, the distance field may be made shorter than the log2 depth of the store buffer. In the foregoing example, the distance field may be made 3 or 4 bits wide to conserve space consumed by the predictor when it is manufactured as an integrated circuit. In doing so, the predictor is able to detect instruction dependencies within eight ($2^3$) or sixteen ($2^4$) store instructions.

In another embodiment, state flags may be omitted from a predictor. Rather than store a state flag, a predetermined distance value (say, 11111) may be designated as an invalid state. In this case, the distance value output from a predictor entry 210.1 may be compared to the invalid code and, if they match, the distance value is blocked from being output from the predictor. This alternative finds application with the embodiment of FIG. 3.

Figure 5:
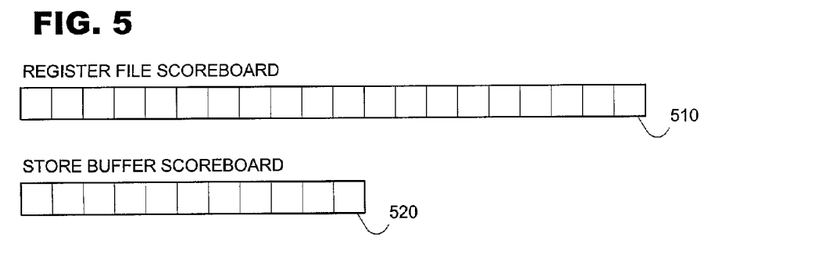
FIG. 5 is a block diagram of entries within the scoreboard according to an embodiment of the present invention.

FIG. 5 is a block diagram of entries within the scoreboard according to an embodiment of the present invention. Conventionally, scoreboards have been used within processing cores to monitor whether data has been written to entries within a register file. According to an embodiment, the scoreboard may be extended to monitor entries within a store buffer and determine when data has been written to them. FIG. 5 illustrates two registers 510, 520. A first register has a bit width that is determined by a number of registers within the register file. The second register has a bit width determined by a number of entries within the store buffer.

In this embodiment, when an allocator receives a new store instruction and assigns it an entry from within the store buffer, a bit may be set in the scoreboard at a position corresponding to the newly allocated entry identified by the head pointer. Thereafter, when the store instruction executes and data is written to the entry in the store buffer, the bit may be cleared. Herein, the "setting" and "clearing" of bits requires only that the bits take mutually exclusive states; a "set" bit may take a value of either 1 or 0 so long as the "cleared" bit take on an inverse value. By doing so, it is possible to examine the entry 520 from the scoreboard and determine which entries in the store buffer have been written to.

Figure 6:
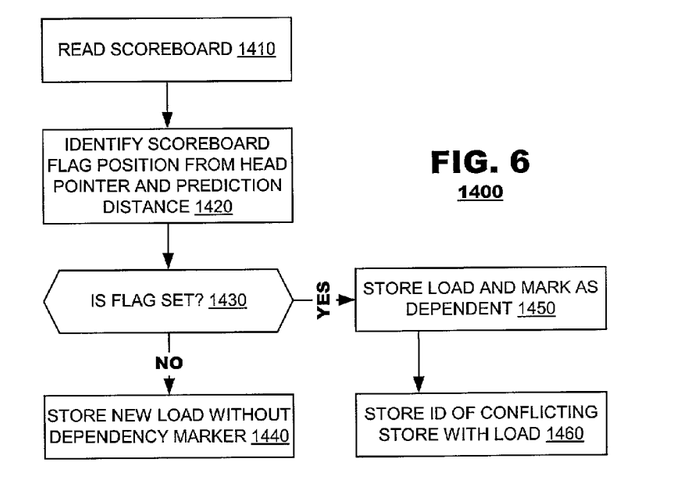
FIG. 6 illustrates a method of the invention for identifying data upon which a load instruction will depend.

FIG. 6 illustrates a method 1400, according to an embodiment of the invention, for determining whether a load collides with an older store. According to the method, when a new load is received by the allocator, the position of a possibly conflicting store instruction may be identified by referring to a prediction distance. The method may read contents of the second scoreboard register 510 (FIG. 5) (box 1410). The position of a possibly conflicting store may be identified by subtracting the prediction distance from the position of a next store to be allocated (box 1420). The value of the scoreboard register 510 at the identified position may determine whether a dependency is to be identified (box 1430). If the scoreboard bit has been cleared, it indicates that the corresponding store instruction has executed at least once. The new load may be stored without a dependency marker (box 1440). Otherwise, the load may be sorted and marked as dependent on a store (box 1450). A buffer ID may be stored with the load instruction identifying the location of the colliding store instruction.

According to another embodiment of the invention, the predictor may be integrated with a trace cache. A trace cache is a known element of many processors. It stores a "trace," a collection of program instructions that are assembled in program order from possibly many locations in system memory. Depending upon implementation, the instructions may be decoded into a form that can be directly executed by the core. Other implementations build traces from non-decoded instructions. When program flow reaches the beginning of a trace, the entire collection of instructions may be retrieved from the trace cache and provided to the processing core. In this regard, the trace cache can provide instructions to the core with higher throughput than other sources, such as ordinary instruction caches where instructions probably are not assembled into program order. Traces can include branch instructions which, if predicted differently from a direction that was taken when they were built, could cause program flow to exit the trace. Thus, although traces can improve system performance substantially, there are no assurances that all instructions in a trace will be executed once the trace is read into the core.

Figure 7:
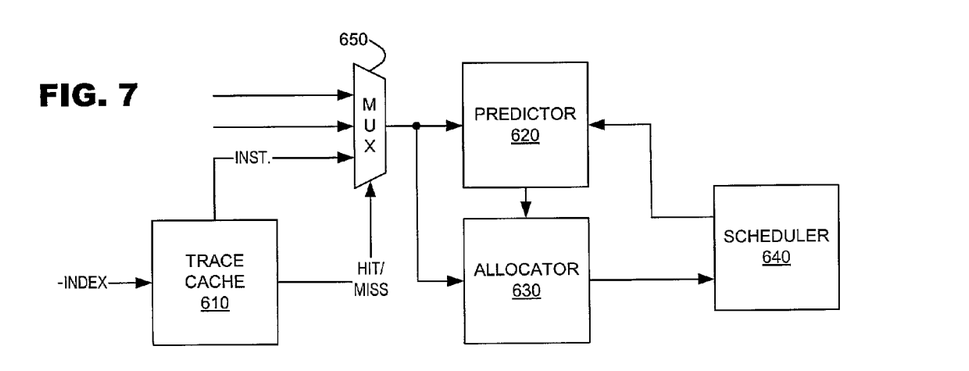
FIG. 7 is a partial block diagram of a processor core provided in communications with a trace cache according to an embodiment of the invention.

FIG. 7 is a partial block diagram of a processor core 600 provided in communications with a trace cache 610 according to an embodiment of the invention. As in prior embodiments, the core 600 may include a predictor 620, allocator 630 and scheduler 640; other core components are omitted from FIG. 7 for the sake of clarity. The core 800 may accept instructions from a variety of sources, including the trace cache 620 and others. A multiplexer 650 may select from among the various instruction sources based on a predetermined priority scheme. For example, when instructions are available from both the trace cache 620 and an instruction cache (not shown), the MUX 650 may prefer the instructions from the trace cache 610. Doing so makes it possible to forward a sequence of instructions already assembled in program order.

The trace cache 610 typically is indexed by an instruction address (labeled "index" in FIG. 7). In response, the trace cache 610 may generate a hit/miss signal that indicates whether the trace cache 610 stores a trace beginning at that address. If so, if the index hits the cache 610, the hit/miss signal may control the MUX 650 to accept instructions from the trace cache rather than from some other source. The MUX 650 may be controlled by other control sources (not shown) as well. In certain embodiments, the predictor 620 may be accessed simultaneously with the trace cache 610 but prediction results would be output from the predictor 620 only if there were a hit in the trace cache 610.

Figure 8:
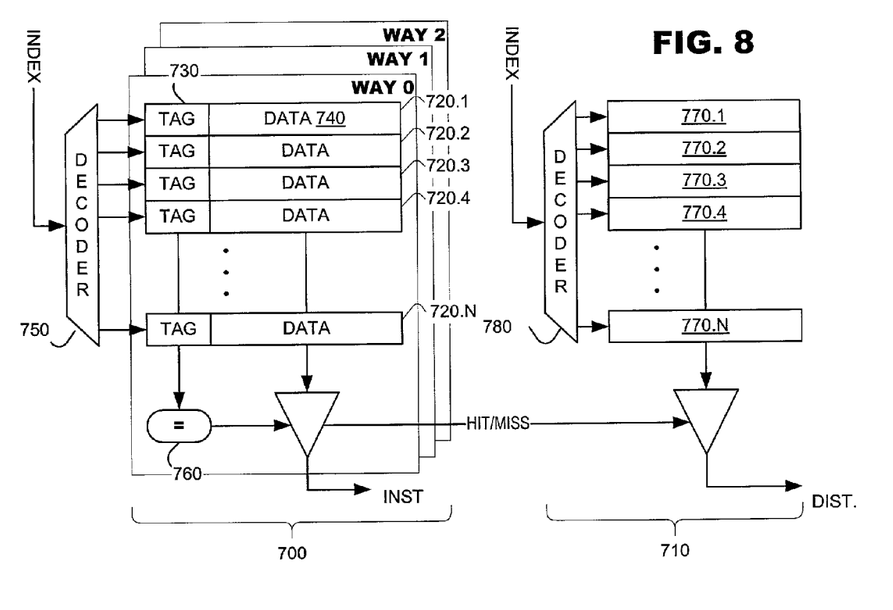
FIG. 8 illustrates an integrated trace cache and a predictor according to an embodiment of the invention.

FIG. 8 illustrates an integrated trace cache 700 and a predictor 710 according to an embodiment of the invention.

The trace cache 700 may include a plurality of trace entries 720.1–720.N, each of which may include a first portion 730 to store a tag field and a second portion, labeled "data" 740, to store instructions. The trace cache 700 is shown as a set-associative cache, having a decoder 750 and a comparator 760. As in prior embodiments, the comparator 760 makes a hit/miss determinations and, in the case of a hit, permits contents of an activated data field 740 to be output from the trace cache.

In an embodiment, the predictor 710 also may include a plural number of entries 770.1–770.N. Each entry has sufficient length to store a valid flag and a prediction distance (not shown separately) for each instruction position in the entries of the trace cache 700. The predictor 710 also may include a decoder 780, responsive to the index signal, to drive the contents of one of the entries. Hit/miss indicators 750 generated from the trace cache 700 may determine whether the contents of the driven predictor entry (say, entry 770.1) will propagate out of the predictor 720.

As FIG. 8 illustrates, while the trace cache 700 is shown as a set associative cache, the predictor 710 need not be set associative. Thus, a set position, for example the $0^{th}$ position of each way, in the trace cache 700 may share a single entry 770.1 in the predictor 720. This embodiment is useful because the predictor 710 is provisioned to store prediction distances for load instructions only. No data would be stored in the predictor corresponding to instructions of other types. In such an embodiment, it is convenient to provide fewer ways in the predictor 710 than in the trace cache because, although the trace cache may store data of several traces in a single set across multiple ways, it is unlikely that load instructions from two different traces will map to the same entry position in the predictor 720.

Figure 9:
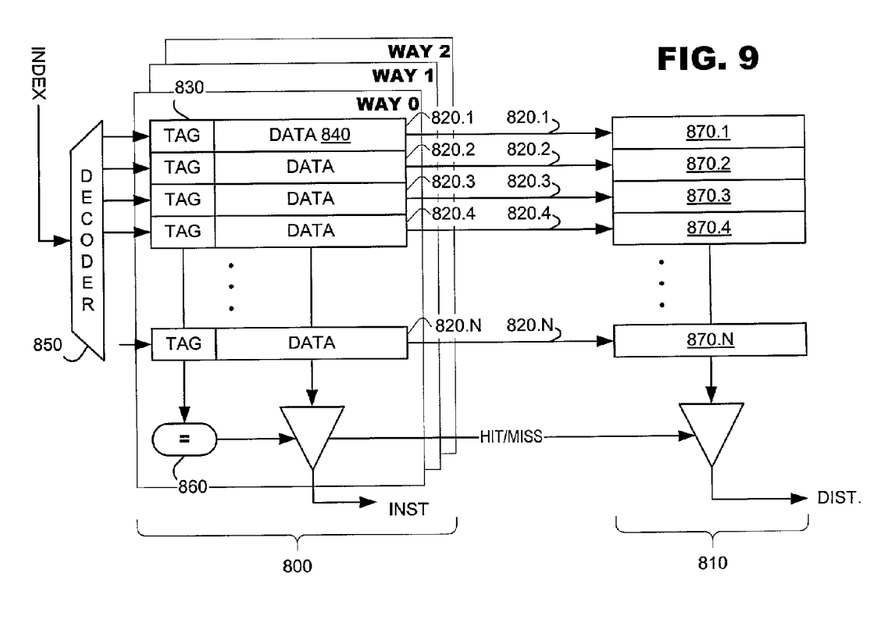
FIG. 9 illustrates an integrated trace cache and a predictor according to an embodiment of the invention.

In another embodiment, shown in FIG. 9, the predictor decoder (780 in FIG. 8) may be omitted from an integrated trace cache and predictor. In this case, driving signals from a single decoder 820 may drive entries of the trace cache 800 and the predictor 810.

In another embodiment, the predictor 710 may be provided as a set-associative cache with a pair of ways (not shown in FIG. 8). In this embodiment, half the ways from the trace cache 700 map to the first way of the predictor 710 and the other half of the ways map to the second way of the predictor 720.

In yet another embodiment, shown in FIG. 9, the predictor 710 may be provided as a direct mapped cache (only a single way) but, for each position of an entry, there may be multiple valid bits V1, V2 and a single distance field DIST. In this embodiment, the first valid flag V1 corresponds to half of the ways in a trace cache. If enabled, it may indicate that the value stored in the distance field is a prediction for one of the traces stored in the first set of ways. Similarly, the second valid flag V2 may correspond to the second half of the way and, if enabled, it may indicate that the value stored in the distance field is a prediction for a trace stored in the second set of ways. Thus, a comparison of the valid flag with a source identifier indicating which way a given trace has been read from can determine whether the prediction value should be used.

Figure 10:
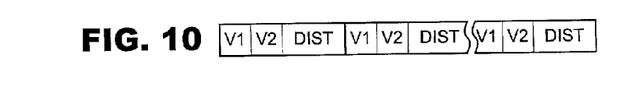
FIG. 10 illustrates a predictor entry according to an embodiment of the present invention.
Figure 11:
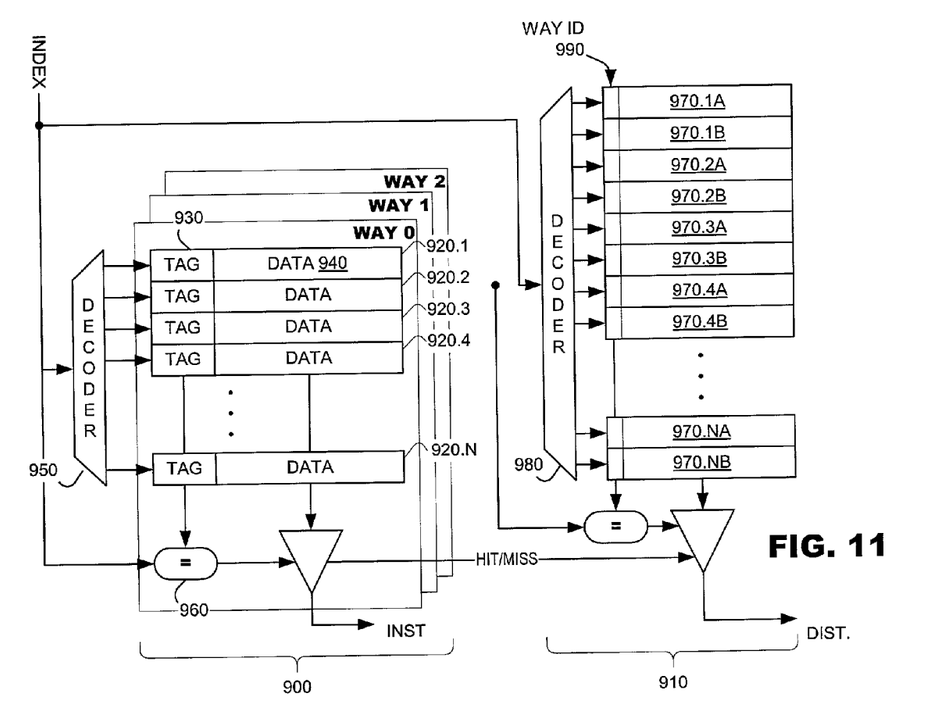
FIG. 11 illustrates an integrated trace cache and a predictor according to an embodiment of the invention.

In an additional embodiment, shown in FIG. 10, the predictor 910 may be provided as a direct mapped cache having two or more entries for each corresponding entry in the trace cache 900. Thus, in FIG. 10, predictor entries are labeled 970.1A, 970.1B, 970.2A, 970.2B, . . . , 970.NA and 970.NB to indicate that two predictor entries (970.1A, 970.1B) correspond to a single set in the trace cache, the entry 920.1 in way 0 and corresponding entries from the other ways in the trace cache 900. Within each predictor entry, there may be provided a way identifier 990 in addition to the data field. Contents of the way identifier 990 may be compared with a portion of the index input to determine which entry to output from the predictor 910. Thus, in this embodiment, when an index is applied to the predictor 910, it may drive data from multiple entries (970.1A, 970.1B). The way identifiers 990 of each driven entry may be compared with another portion of the index signal to determine whether there is a match. If so, data from the corresponding entry is permitted to propagate from the predictor 910.

Figure 12:
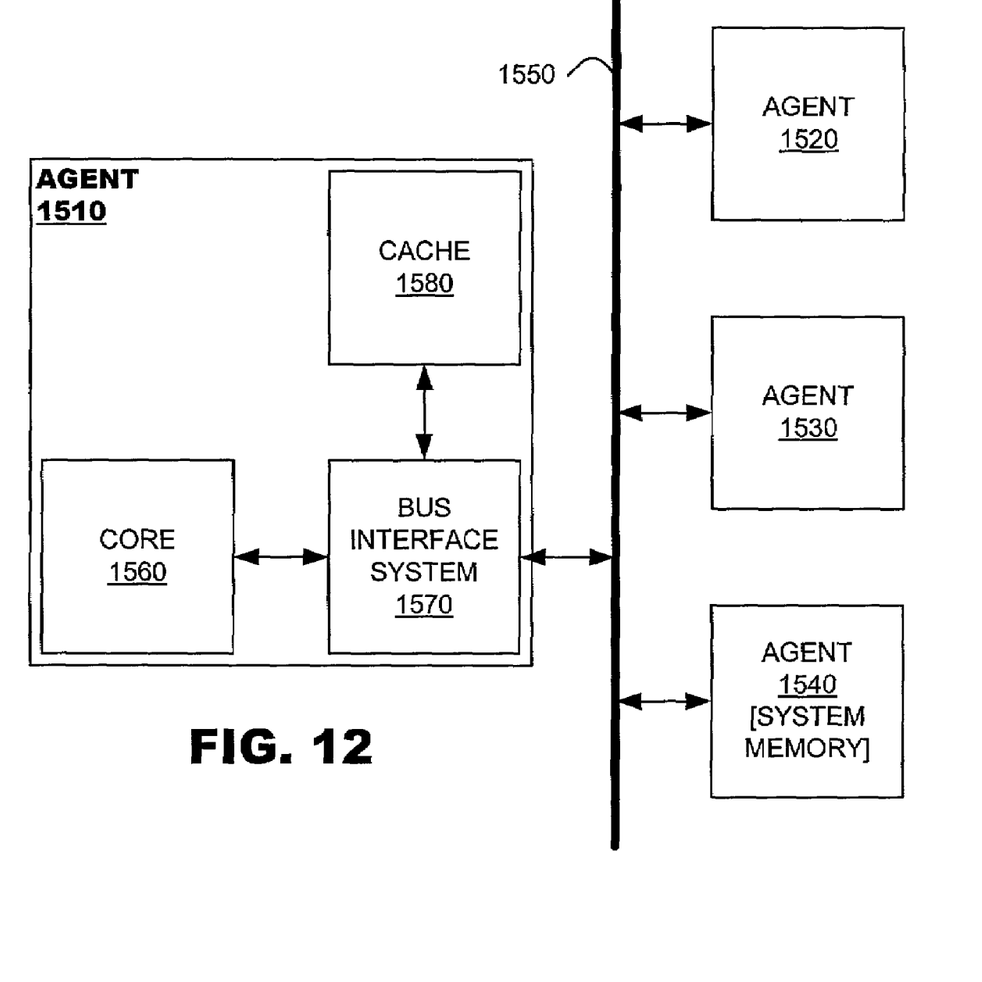
FIG. 12 is a block diagram of a computer system according to an embodiment of the present invention.

FIG. 12 is a block diagram of a computer system 1500 according to an embodiment of the present invention. The system 1500 may include a plurality of agents 1510-X40 interconnected via a communication bus 1550. An "agent" may be a processor, a system memory, a bridge interface, a chipset, a digital signal processor, an application specific integrated circuit (ASIC) or any other integrated circuit that exchanges data across a communication bus 1550. According to an embodiment of the present invention, one or more agents (such as agent 1510) may be provisioned according to the foregoing embodiments and may include a core 1560 with a predictor as described, a bus interface system 1570 and an internal cache 1580.

The core 1560 may generate requests to transfer data via read or write commands. These requests may be input to the bus interface system 1570, which determines if the request may be fulfilled internally (for example, with reference to the internal cache 1580). If not, the bus interface system 1570 may generate a transaction on the bus 1550 to implement the request. For example, for a read request, the bus interface system 1570 may post data on the bus identifying that data at an addressed location in system memory 1540 is to be read to the agent 1510. In response, other agents may determine whether they store copies of the requested data and, if so, whether any of their copies are more current than a copy in system memory. If an agent (say, agent 1520) has a more current copy, it provides its copy to the requesting agent 1510. Otherwise, system memory 1540 may provide a copy of the data to the requesting agent 1510. Thus, load instructions and store instructions, such as those that provide a basis for the predictions described in the foregoing embodiments, are retrieved into an agent 10 using transactions posted on an external bus 1560.

Several embodiments of the present invention are specifically illustrated and described herein. However, it will be appreciated that modifications and variations of the present invention are covered by the above teachings and within the purview of the appended claims without departing from the spirit and intended scope of the invention.

FIG. 6 illustrates a method for identifying data upon which a load instruction will depend according to an embodiment of the present invention.

FIG. 1 is a block diagram of an execution core 100 of a processing agent according to an embodiment of the present invention. The core 100 may include a predictor 110, an allocator 120, a scheduler 130, a store buffer 140, a scoreboard 150, a register file 160 and a plurality of execution units. The predictor 110 receivesd decoded instructions and predicts dependencies between them and previously received instructions. The allocator 120 also receives the decoded instructions and assigns recources to them from within the core 100. For example, the allocator 120 may assign registers from within the register file 160 to an ADD instruction or may assign buffer entries from within the store buffer 140 to store instructions. The recources allocated, of course, depend upon the instructions received by the allocator. The allocator 120 also stores the instructions in the scheduler 130, typically in program order.

In an embodiment, the various ways 210–240 may operate as described above in parallel. At most one of the ways (say, way 210) should output a distance value in response to an input instruction pointer. This output may be used by the remainder of the core (FIG. 1) as a predicted distance.

FIG. 5 is a block diagram of entries within the coreboard according to an embodiment of the present invention. Conventionally, scoreboards have been used within processing cores to monitor whether data has been written to entries within a register file. According to an embodiment, the scoreboard may be extended to monitor entries within a store buffer and determine when data has been written to them. FIG. 5 illustrates two registers 510, 520. A first register 510 has bit width that is determined by a number of registers within the register file. The second register 520 has a bit width determined by a number of entries within the store buffer.

FIG. 7 is a partial block diagram of a processor core 600 providesd in communications with a trace cache 610 according to an embodiment of the invention. As in prior embodiments, the core 600 may include a predictor 620, allocator 630 and scheduler 640; other core components are omitted from FIG. 7 for the sake of clarity. The core 600 may accept instructions from a variety of sources, including the trace cache 610 and others. A multiplexer 650 may select from among the various intstruction sources based on a predetermined priority scheme. For example, when instructions are available from both the trace cache 610 and an instruction cache (not shown), the MUX 650 may prefer the instructions from the trace cache 610. Doing so makes it possible to forward a sequence of instructions already assembled in program order.

FIG. 12 is a block diagram of a computer system 1500 according to an embodiment of the present invention. The system 1500 may include a plurality of agents 1510–1540 interconnected via a communication bus 1550. An "agent" may be a processor, a system memory, a bridge interface, chipset, a digital signal processor, an application specific integrated circuit (ASIC) or any other integrated circuit that exchanges data across a communication bus 1550. According to an embodiment of the present invention, one or more agents (such as agent 1510) may be provisioned according to the foregoing embodiments and may include a core 1560 with a predictor as described, a bus interface sstem 1570 and an internal cache 1580.

We claim:

1. A method of processing a load instruction, comprising:
responsive to receipt of the load instruction, predicting whether the load instruction is dependent upon a previous store instruction, the predicting including reading a store buffer scoreboard having indicators of executed store instructions to determine whether a potentially colliding store instruction has executed,
if the load instruction is dependent upon a previous store instruction, identifying the previous store instruction as a colliding store instruction, and identifying a distance from the load instruction to the colliding store instruction, the distance represented in terms of a number of store instructions separating a most recently received store instruction and the colliding store instruction,
determining whether the colliding store instruction is present in a core execution unit,
if the colliding store instruction is present in the core execution unit, storing the load instruction in association with a dependency marker identifying the distance, and
scheduling the load instruction after the colliding store instruction has executed.

2. The method of claim 1, further comprising, if the load instruction is predicted not to be dependent on any previous store instruction, storing the load instruction without a dependency marker.

3. The method of claim 1, further comprising, if the colliding store instruction is not present in the core execution unit, storing the load instruction without a dependency marker.

4. A method of processing a load instruction, comprising:
responsive to receipt of the load instruction, predicting whether the load instruction is dependent upon a previous store instruction,
if so, identifying a distance from the load instruction to a colliding store instruction, the distance represented in terms of a number of store instructions separating a most recently received store instruction and the colliding store instruction,
determining whether the colliding store instruction is present in a core execution unit, and
if the colliding store instruction is present in the core execution unit, storing the load instruction in association with a dependency marker identifying the distance,
wherein the determining comprises, with reference to a queue of previously received store instructions: identifying a queue position offset from a head of the queue by the distance,
if the queue position is not between the head and a tail of the queue, then determining that the colliding store is not present in the core execution unit.

5. The method of claim 4, wherein the determining further comprises, if the queue position is between the head and the tail:
determining that the colliding store instruction is present in the core execution unit, and
reading data out of the queue position, the data forming a basis of the dependency marker.

6. A processing core, comprising:
an allocator to allocate resources within the core,
a scheduler coupled to the allocator,
a store buffer, comprising entries to store data associated with store instructions,
a scoreboard, having a register to indicate which entries of the store buffer have been written to due to execution of store instructions,
a predictor to indicate predicted dependencies among a newly received load instruction and previously received store instructions and to identify a colliding store instruction by a distance represented in terms of a number of store instructions separating a most recently received store instruction and the colliding store instruction the distance to be output to the allocator, and
a trace cache coupled to the predictor, the predictor to output a result based on a hit in the trace cache.

7. The processing core of claim 6, wherein the predictor comprises a set associative cache.

8. The processing core of claim 6, wherein the predictor comprises:
a plurality of ways, each way comprising:
a plurality of entries each having fields to store an instruction address and a state field, and an address decoder having activation outputs coupled to respective entries, a comparator having inputs coupled to an address input of the predictor and to the instruction address field of the entries, a controller having inputs coupled to an output of the comparator and to state fields of the entries; and a second plurality of entries to store prediction distance values, a buffer having inputs coupled to the second plurality of entries and outputs from controllers in the ways.

9. The processing core of claim 6, wherein the predictor comprises a plurality of entries, each to store address data, state data and prediction distance values.

10. The processing core of claim 6, wherein the allocator comprises a queue to store newly received store instructions buffer assignments in the store buffer.

11. A processing core, comprising:

a trace cache having a plurality of trace cache entries to store program instructions, and a predictor having a plurality of predictor entries, to store, in predictor entry positions corresponding to positions of load instructions stored in the trace cache entries, dependency predictions associated with the load instructions, wherein the trace cache and predictor both are set-associative caches, the predictor having a fewer number of ways than the trace cache, and wherein each predictor entry has the same number of entry positions as a trace cache entry, each predictor entry having a field for a prediction distance and a plurality of valid fields, each valid field identifying a trace cache way for which a stored prediction distance corresponds.

12. A method, comprising:

by a first agent, issuing a transaction on a communication bus addressed to a cache line in a system memory, by another agent, providing a copy of data to the first agent in response to the transaction, by the first agent:

for a load instruction contained within the data, predicting whether the load instruction collides with a store instruction that occurs prior to the load instruction in program flow, the predicting including reading a store buffer scoreboard having indicators of executed store instructions to determine whether a potentially colliding store instruction has executed;

if the load instruction is dependent upon a previous store instruction, identifying the previous store instruction as a colliding store instruction, and identifying a distance from the load instruction to the colliding store instruction, represented by a number of store instructions separating the load instruction from the colliding store instruction, determining whether the colliding store instruction is present in a processing core of the first agent, if the colliding store instruction is present, storing the load instruction in the processing core with a dependency marker identifying the distance, and scheduling the load instruction after the colliding store instruction has executed.

13. The method of claim 12, further comprising, if the load instruction is predicted not to be dependent on any previous store instruction, stonng the load instruction without a dependency marker.

14. The method of claim 12, further comprising, if the colliding store instruction is not present in the core execution unit, storing the load instruction without a dependency marker.

15. The method of claim 12, wherein there are at least three agents in the system, including the first agent and the system memory, and the providing comprises, if the third agent stores a copy of the data that is modified with respect to a corresponding copy stored in system memory, providing the modified copy from the third agent to the first agent.

16. The method of claim 12, wherein, if no other agent stores a copy of the data that is modified with respect to a corresponding copy stored in system memory, the providing comprises providing a copy from system memory to the first agent.

17. A method, comprising:

by a first agent, issuing a transaction on a communication bus addressed to a cache line in a system memory, by another agent, providing a copy of data to the first agent in response to the transaction, by the first agent:

for a load instruction contained within the data, predicting whether the load instruction collides with a store instruction that occurs prior to the load instruction in program flow, if so, identifying a distance from the load instruction to the store instruction, represented by a number of store instructions separating the load instruction from the colliding store instruction, determining whether the colliding store instruction is present in a processing core of the first agent, if the colliding store instruction is present, storing the load instruction in the processing core with a dependency marker identifying the distance, wherein the determining comprises, with reference to a queue of previously received store instructions:

identifying a queue position offset from a head of the queue by the predicted distance, if the queue position is not between the head and a tail of the queue, then determining that the colliding store is not present in the core execution unit.

18. The method of claim 17, wherein the determining further comprises, if the queue position is between the head and the tail:

determining that the colliding store is present in the core execution unit, and reading data out of the queue position, the data forming a basis of the dependency marker.

* * * * *